United States Patent Office 2,913,326
Patented Nov. 17, 1959

2,913,326

PROPYL-N,N-DIETHYLTHIOLCARBAMATE AND USE AS HERBICIDE

Harry Tilles, El Cerrito, Calif., and August B. Lindquist, Maitland, Fla., assignors to Stauffer Chemical Company, a corporation of Delaware No Drawing. Application January 25, 1956
Serial No. 561,369

3 Claims. (Cl. 71—2.7)

This invention relates to a certain novel composition of matter, the method of making the composition, and the use of the composition as an herbicide. More particularly, it has been found that n-propyl N,N-diethylthiolcarbamate (hereinafter sometimes referred to as R–1429) has valuable herbicidal properties and is particularly useful as a pre-emergence herbicide.

The following illustrative example demonstrates the method which may be employed to make the compound of the present invention. In the example, all parts are by weight.

*Example 1.*—Sodium is disposed in xylene using oleic acid as the stabilizing agent until a particle size of 5–200 microns in diameter is obtained. Dispersion, equivalent to an amount of 23 parts (1.0 mole) of sodium, is then transferred to a reactor which has been previously flushed out with argon (or other inert gas such as nitrogen). A solution of 85 parts (1.12 mole) of 1-propanethiol dissolved in 86 parts of xylene is then gradually added to the sodium dispersion over an interval of 30 minutes. The temperature is maintained at 25° to 36° C. by cooling. The sodium propylmercaptide forms as finely divided crystals which make an easily stirrable slurry. This suspension is heated to reflux, the heat is turned off, and 135.6 parts (1.0 mole) of diethylcarbamyl chloride is added over an interval of 17 minutes to the refluxing slurry. The heat of reaction is sufficient to keep the xylene refluxing. After all of the carbamyl chloride has been added, the mixture is refluxed for an additional three hours. It is then cooled, filtered from sodium chloride which has formed during the reaction, and the solvent is removed under reduced pressure. The residual liquid is then distilled under vacuum to give 153 parts (87.5% yield) of n-propyl N,N-diethylthiolcarbamate (B.P. (18 mm.) 112.2–116.6° C. $n_D^{25.6}$ 1.4788).

The compound of the present invention has been extensively tested as a herbicide and has been particularly evaluated as a pre-emergence herbicide. Pre-emergence herbicides are ordinarily used by placing a narrow band of the herbicide over the center of a seeded crop row at the time of planting or before the crop emerges. If the herbicide is harmless to the desired crop seeds or seedlings but phytotoxic to the weed seeds or seedlings, most frequently encountered, the crop grows in an almost weed-free environment. Of course, the pre-emergence herbicide may be used over the entire field, but it is normally used in a narrow band which straddles the crop row and the balance of the weeds are controlled by various cultivation methods. The herbicides of the present invention are selective toward small seeded annual grasses and broad-leafed plants, and so are effective against the most common weeds but have little effect on such valuable row crops such as corn and beans. The phytocidal composition may be applied to the soil in any convenient form. For instance, it can be dissolved in a solvent, such as acetone, or emulsified and sprayed onto the soil, or it can be combined with a dry inert carrier and applied as a dust or as granules. Although the composition may be applied to an entire crop plot, it is generally preferred to apply it in a narrow band, say 6", over the seeded row of a newly planted crop. Generally, rates of application of from one-half to twenty pounds per acre of actual area treated will be found suitable.

The following example shows the effect of R–1429 when used to protect corn from weeds:

*Example 2.*—A field test consisted of applying the compound at the rate of 1, 2, 4, 8 and 10 pounds/80 gallons/acre as pre-emergence treatments to corn. The compound was dissolved in a small amount of acetone emulsified in water and applied at the desired rate by mounting a spray nozzle behind the planter packer wheel. A 6" band was applied and the rates of application are on the basis of the area of actual application and not on the total area of the plot treated. The weather was sunny, the air temperature 70° F., the soil temperature was 78°, and the seed bed was in good tilth and very dry. Immediately after the test, the plots were sprinkler irrigated. Each treatment was replicated three times. Before the test, the entire area had been seeded with rye and oats and dead nettle seeds were present in the soil. In each case, the growth of the corn was normal in comparison with check plots. The following data were obtained:

TABLE I

*Results 16 days after application*

| | Rate A, lb. | Corn Stand [1] | | | | Rye [2] | | | |
|---|---|---|---|---|---|---|---|---|---|
| | | I | II | III | Av. | I | II | III | Av. |
| R–1429 | 1 | 13 | 9 | 6 | 9.3 | 100 | 100 | 100 | 100 |
| | 2 | 11 | 10 | 11 | 10.6 | 100 | 100 | 100 | 100 |
| | 4 | 8 | 7 | 11 | 8.6 | 100 | 100 | 100 | 100 |
| | 8 | 6 | 4 | 10 | 6.6 | 100 | 100 | 100 | 100 |
| | 10 | 11 | 17 | 11 | 13.0 | 100 | 100 | 100 | 100 |
| Check | 0 | 9 | 6 | 11 | 8.6 | 0 | 0 | 0 | 0 |

| | Rate A, lb. | Oats [2] | | | | Dead Neetle [2] | | | |
|---|---|---|---|---|---|---|---|---|---|
| R–1429 | 1 | 90 | 90 | 90 | 90 | 100 | 100 | 100 | 100 |
| | 2 | 100 | 100 | 100 | 100 | 100 | 100 | 100 | 100 |
| | 4 | 100 | 100 | 100 | 100 | 100 | 100 | 100 | 100 |
| | 8 | 100 | 100 | 100 | 100 | 100 | 100 | 100 | 100 |
| | 10 | 100 | 100 | 100 | 100 | 100 | 100 | 100 | 100 |
| Check | 0 | 0 | 0 | 0 | 0 | 0 | 0 | 0 | 0 |

[1] Corn stand—number of plants/10 ft. of row.
[2] Percent control of weeds.

*Example 3.*—A test was made similar to Example 1 except that R–1429 was applied at 20 pounds per acre. The crops tested were corn, cotton, peas, snap beans and squash while the weeds tested were rye, oats, redroot, dead nettle, chickweed and annual bluegrass. The R–1429 injured the crops to some degree except for snap beans, but did give 100% control of all weeds except for dead nettle where the control varied from 65% to 100%.

I claim:
1. As a new compound, n-propyl N,N-diethylthiolcarbamate.
2. The method of combatting weeds comprising applying to the soil a phytotoxic amount of n-propyl N,N-diethylthiolcarbamate.
3. The method of claim 2 wherein the compound is applied in a narrow strip to a row crop at a rate of from one-half to twenty pounds per acre of area actually treated.

(References on following page)

References Cited in the file of this patent

UNITED STATES PATENTS

| | | |
|---|---|---|
| 2,060,733 | Hunt et al. | Nov. 10, 1936 |
| 2,160,880 | Loane et al. | June 6, 1939 |
| 2,212,895 | Allen | Aug. 27, 1940 |
| 2,562,011 | Baumgartner | July 24, 1951 |
| 2,636,816 | Stewart | Apr. 28, 1953 |
| 2,642,451 | Weijlard et al. | June 16, 1953 |
| 2,650,876 | Stewart | Sept. 1, 1953 |
| 2,687,348 | Kosmin | Aug. 24, 1954 |
| 2,723,989 | Harman | Nov. 15, 1955 |

FOREIGN PATENTS

| | | |
|---|---|---|
| 688,726 | Great Britain | Mar. 11, 1953 |

OTHER REFERENCES

Riemschneider et al.: Monatshefte für Chemie 84, 518–21 (1953).